Jan. 29, 1952  A. G. HOUPT  2,584,080
APPARATUS FOR REACTING AMMONIACAL GASES
Filed April 24, 1947  2 SHEETS—SHEET 1
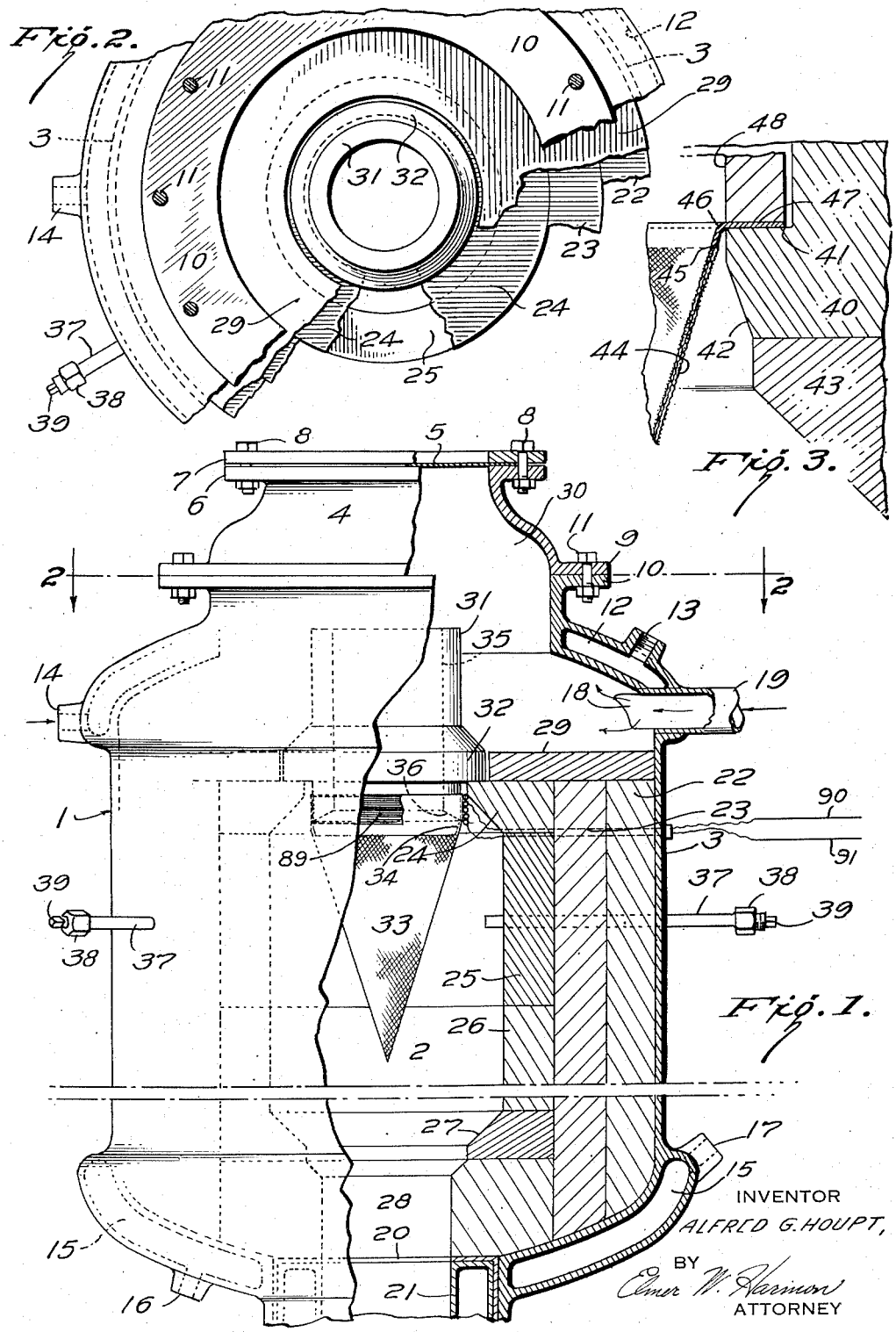
INVENTOR
ALFRED G. HOUPT,
BY
ATTORNEY

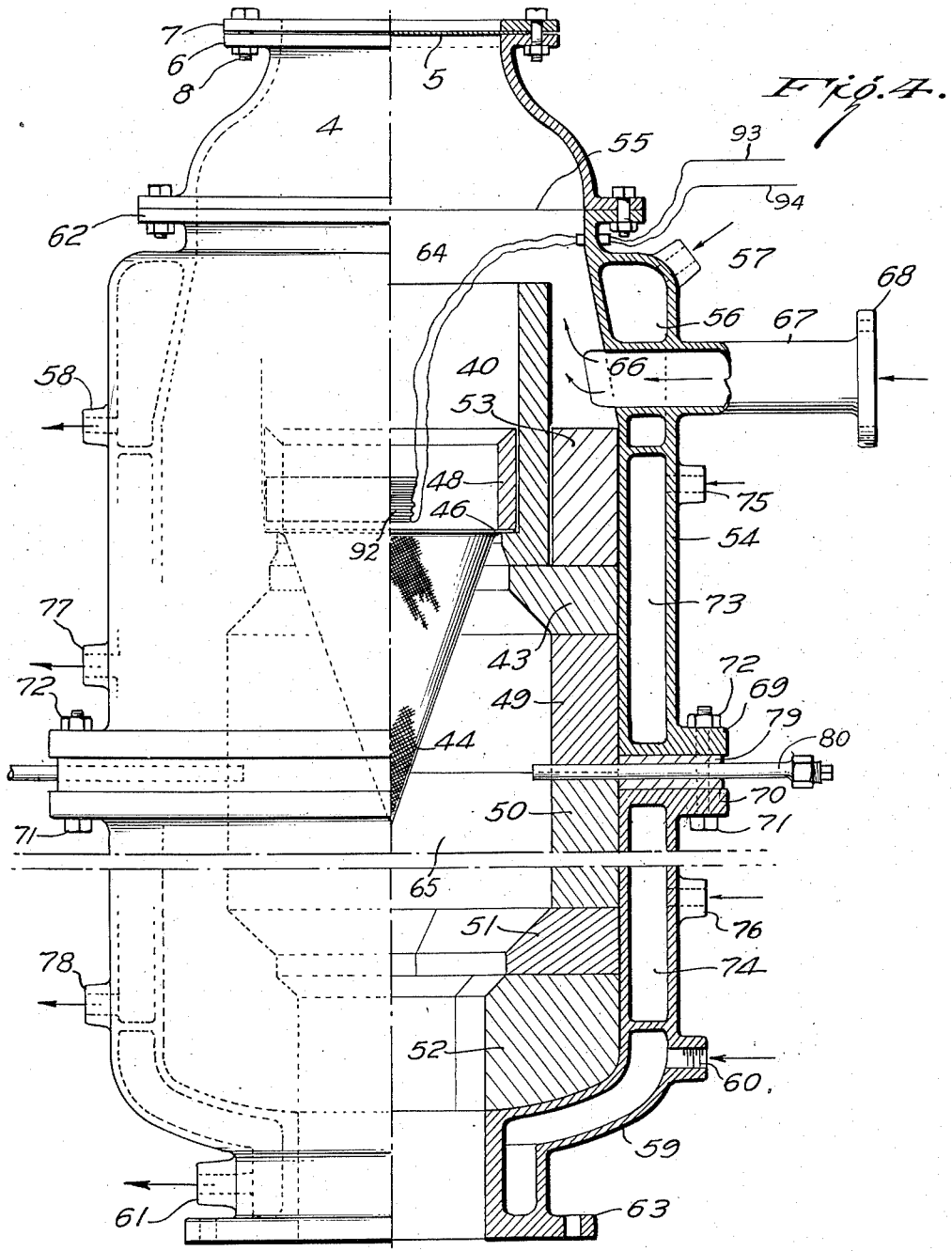

Patented Jan. 29, 1952

2,584,080

UNITED STATES PATENT OFFICE 2,584,080

APPARATUS FOR REACTING AMMONIACAL GASES

Alfred G. Houpt, Stamford, Conn., assignor to American Cyanamid Company, New York, N. Y., a corporation of Maine Application April 24, 1947, Serial No. 743,595

5 Claims. (Cl. 23—288)

This invention relates to an improvement in apparatus for performing catalytic oxidation and more particularly to an improved combustion chamber for this purpose. Still more specifically, the invention relates to an improved combustion chamber particularly well adapted for use in producing hydrocyanic acid.

Production of hydrocyanic acid for industrial use has been accomplished in many different ways. Some of these, for example the acid treatment of cyanides, have been commercially developed to produce large annual tonnages. Because of the importance of the product, frequent proposals have been advanced for processes using novel or more readily-available raw materials. These usually represent attempts to lower production costs. However, for various reasons, none of these newer proposals have proved to be wholly successful.

One of the more promising appearing of such proposals was to react a gas mixture comprising ammonia, a gaseous or vaporized hydrocarbon, and the requisite amount of oxygen or air. The mixture, at or below atmospheric pressure, was subjected to combustion in the presence of a suitable catalyst, preferably a metallic platinum-iridium alloy, although other noble metals and alloys were suggested. The hydrocyanic acid content of the combustion products was then separated therefrom.

Theoretically the operation of such a process appears to offer many commercial advantages. Readily-available starting materials are utilized and the reaction would appear to be capable of being readily conducted in simple apparatus. In attempted practice, however, appearances proved to be deceptive. Many difficulties, largely unexpected, developed. As a result the process was considered impractical for commercial development.

One of the most serious drawbacks was found to be the difficulty in maintaining proper flow conditions during reaction. This problem appears to involve such various factors as inability to deliver the gas to the catalyst under uniform optimum conditions, failure to obtain uniform conditions as the gas passes the catalyst, inability to maintain sufficiently uniform temperatures over and through the catalyst and inability to perform efficient combustion without exceeding a gas temperature which can be readily handled in a sufficiently-resistant structural material.

Nor is the least of the problems the fact that if reaction is permitted to go to substantial completion, little or no HCN will be contained in the combustion products. Therefore, the reaction must not be allowed to proceed beyond a certain point. Of necessity, then, fairly accurate control is required. In attempts to carry out the process in the past this necessary degree of control could not be obtained. The resultant yields were poor and the costs excessive.

Nevertheless, the process, if it can be successfully operated, offers such desirable features that in recent years much work, largely ineffective, has been done on it. This work, however, has not succeeded in adapting the process for satisfactory commercial use and the demand continues to exist for suitable means for its successful accomplishment.

It is, therefore, the principal object of the present invention to develop a type of reaction chamber suitable for use in carrying out this and other similar processes. Preferably such an apparatus should be capable of obtaining substantially uniform conditions before and during reaction, without being unduly complicated in structure and operation. Preferably, too, it should be capable of operation at superatmospheric pressures.

The objects of the invention have been accomplished by developing a novel reactor combining in a simple apparatus a number of new and novel features. The apparatus of the present invention will be more completely described with reference to the accompanying drawings in which:

Figure 1 is an elevation, partly in section of one type of apparatus of the present invention showing a suitable catalyst structure in place therein;

Figure 2 is a horizontal, sectional view taken along line 2—2 of Figure 1;

Figure 3 is a detailed vertical sectional view showing a different type of catalyst structure and mounting; and Figure 4 is an elevation, partly in section, showing a further type of reaction chamber utilizing the catalyst mounting of Figure 3.

A catalyst structure, particularly well suited for carrying out the reaction of air, ammonia, and a hydrocarbon to obtain HCN is described in my co-pending application, Serial No. 743,591, filed of even date and issued as U. S. Patent No. 2,552,279 on May 8, 1951. This structure involves the combination of a multi-layered pyramidal section of catalytic metal gauze and a unitarily attached mounting ring or support of sheet material. The pyramidal or conical section is preferably made by forming a flat sheet of gauze into a suitable shape, cutting the sheet about a radius and rolling the sheet around one edge of the cut until several, usually three, superposed layers are obtained. The resultant conical structure is held in shape by suitable stitching, stapling or welding and is then welded to the sheet metal support. Since this catalyst structure is superior to others for the purpose and since it does not involve the use within the reaction chamber itself of internal supports for the gauze, the present invention will be discussed in relation thereto.

A particular problem in the reaction of a mixture of ammonia, a hydrocarbon and air or oxygen to produce HCN, is the difficulty with structural materials. Prior to reaction, the gaseous mixture may be handled in apparatus of various metals, preferably aluminum, but if necessary in materials such as iron or steel. After reaction, the problem is entirely altered. Ferrous metal materials must be avoided for one or more of several reasons. Some are subject to attack by the combustion products, particularly under the operating conditions. Others have a wholly undesirable effect on the reacted products. Such ordinarily considered resistant materials as iron, stainless steel, "Durion" and the like are quite useless. Not only are they subject to corrosion under operating conditions but also because of the effect of ferrous metals in producing ferricyanides from the HCN or in catalyzing decomposition of both HCN and $NH_3$ at higher temperatures.

Wholly surprising is the fact that the combustion products can be safely handled in aluminum metal. This is particularly surprising in view of the noted fact that materials ordinarily considered inert or substantially inert are useless. By contrast, aluminum which is normally considered an active metal is substantially inert under the operating conditions. This feature forms no part of the instant invention, but must be considered since it is one of the factors governing the structure of the combustion chamber of the present invention.

Since aluminum appears at the present time to be the only practical structural material to handle the combustion products, certain limitations are imposed on the structure of the combustion chamber itself. The combustion temperatures, which may reach as high as 1300°–1500° C. and usually average in the neighborhood of 900°–1100° C. exceed the melting point of aluminum, at about 660° C. This means that the aluminum must be protected and the temperature of the combustion products must be reduced to below about 600° C. or less as soon as possible. On the other hand, the temperature of the materials in immediate contact with the catalyst must not be appreciably reduced. The apparatus of the present invention is well suited to handle this problem.

In the present invention, as shown in the accompanying drawings, the general design of the reactor, designated generally as 1 in Figure 1, is intended to enclose an open combustion chamber 2 of sufficient size to permit completion of oxidation to the desired degree. This chamber is formed by building up a number of structural elements. An elongated outer casing 3, of suitable material, preferably aluminum, is used to combine the structure into a structural whole. This outer casing may be a single structural element as shown for simplicity of illustration in Figure 1. It can be a single suitable casing, but generally is made, as shown, by welding together a number of separately made parts. If desirable, it may even be united by riveting or by suitable flanges and bolts. The effectiveness of the casing for holding the reactor together as a unit is not particularly concerned with how the casing is itself formed.

Casing 3 does involve a number of features which are present regardless of the specific shape and design of the casing per se. At the top, as shown in both Figures 1 and 4, there will be provision for attaching a suitable cover 4 containing an explosion disc 5, mounted thereon by any suitable means such as flange 6, ring 7 and bolts 8. The cover may be attached in any suitable way as by flanges 9 and 10 and bolts 11. The upper part of the casing will include a hollow jacket, shown at 12 in Figure 1, for the circulation therein of heating or cooling fluid introduced through conduit 13 and discharged through conduit 14 or their structural equivalents. Similarly the bottom of the casing will include a hollow section, shown at 15 in Figure 1, for the circulation of fluid introduced through conduit 16 and discharged through conduit 17 or their structural equivalents. If desired, a plurality of either or both inlet and outlet conduits may be provided for both the upper and lower jackets.

Gas is introduced into the casing through the open mouth 18 of a flared conduit 19 and is discharged at the bottom through an open port 20 at the bottom end. Also shown in Figure 1 is a portion of the discharge conduit 21 which, as shown, may be made hollow for the circulation of additional cooling fluid therethrough if so desired.

Installation of the reactor lining is accomplished by introducing suitably formed shapes through the top of casing 3. As shown in Figure 1, the lining is built up of a plurality of sections of refractory material, said sections, in turn, being used to form a plurality of concentric layers. The outer layers, for simplicity represented by layers 22 and 23, although a larger number are ordinarily used, are made up of some refractory material such as insulating fire brick or the like. The insulating bricks, or their equivalents, which go to make up these outer layers are so chosen of progressively different thermal conductivity characteristics as to maintain the proper thermal gradient between the walls of chamber 2 and the casing 3 to protect the latter from becoming overheated. This is particularly important where casing 3 is aluminum.

Within these insulating layers is the actual lining of combustion chamber 2. This inner lining is of some hard, smooth, high-temperature refractory such as mullite or the like having as low an iron content as possible. As shown in Figure 1, the inner chamber is formed by a number of vertically superposed annuli 24, 25, 26, 27, 28 and 29. The lining is composed of these separate annuli for a number of reasons including simplicity of fabrication, ease of replacement, and convenience in installation. The number of annular rings and the exact shape of any particular ring used may be widely varied, depending on the overall size of the apparatus and the particular catalyst mounting used. While most of the annuli comprising the inner refractory lining could be made up as unitary rings, such rings would crack in service. It is simpler, therefore, to make the rings of a plurality of curved segments, either half circles or, as will be usually done, segments of smaller arc.

As shown in Figure 1, upper plate ring 29 covers the remainder of the lining. The liner rings 24 to 29 therefore not only enclose the combustion chamber 2 but also serve to separate the space in the reactor into two chambers. Ring 29, together with part of casing 3 and cover 4, forms gas chamber 30 into which gas is introduced through mouth 18 of conduit 19. Ring 29 also helps prevent any dust from the outer insulating bricks spreading into the inner chambers.

The chambers 30 and 2 are connected only through a central port, i. e., the inner opening of rings 24 and 29, which port is closed by a short tube 31 of the same or similar material as the liner rings. Gas passes from chamber 30 into chamber 2 through tube 31. As shown in Figure 1, tube 31 has an outer annular shoulder 32 which rests on and is supported by part of the horizontal flat upper surface of ring 24. In Figure 1, ceramic conduit 31 is shown to be capped at its lower end by the catalyst structure. As discussed above, the preferred catalyst is made up of a multi-layered conical gauze section 33 joined to a sheet metal sleeve 34. Sleeve 34 fits snugly about the outer diameter of conduit 31. It is also desirable, if possible, that the lower part of the inner face 35 of tube 31 be faired off to a sloping surface 36.

Experience has shown that it is highly desirable, if not actually essential, that the gas mixture be led to the catalyst gauze in as nearly stream line flow as possible. As a consequence, the upper end of conduit 31 extends upwardly into chamber 30 sufficiently to baffle direct flow from conduit 19 into conduit 31.

Extending through the metal casing and ceramic lining are a plurality of suitable conduits 37 each provided at its outer end with an enlarged, internally threaded head 38 or a structural equivalent. In Figure 1 heads 38 are closed temporarily with plugs 39. In operation, plugs 39 may be replaced by suitable fittings adapted to hold various auxiliary units, for example, an ignited, temperature measuring devices such as thermocouples or their equivalent and other similar accessories. Since these igniters, couples and the like are conventional and form no part of this invention they need not be illustrated.

The over-all reaction, when preceeding vigorously, is highly exothermic. Consequently, as noted above, an insulating lining, designed to maintain the proper thermal gradient between the inner chamber and the outer shell, is provided. This is done to protect the latter. In addition, it is also helpful in many cases to be able to cool the shell, at least in part, by removing heat therefrom. As a result, cooling fluid is generally circulated in jackets 12 and 15. The jackets are not so limited in use, however, for in some other reactions, it may be desirable to circulate heating fluid therethrough. For the areas and gas flows involved in the illustrative HCN reaction, little effect can be produced by these jackets on the gases themselves. The primary purpose of circulating the fluid is to protect the shell. Preferably, the upper fluid circulating system utilizing hollow jacket 12 is independent of the fluid circulating system utilizing the lower hollow jacket 15. The amount of heating or cooling which it may be desirable to accomplish in one jacket may have no particular necessary relation to that desirable in the other.

In Figure 1 the catalyst is shown as capped on the end of a gas conduit 31. A more desirable mounting for some purposes is detailed in Figures 3 and 4 in which the lower part of the inner face of a tube 40, corresponding to tube 31 in Figure 1, is provided near the bottom of its inner face with a flat shoulder 41. Below shoulder 41 the inner face is faired off to provide face 42 which slopes downward and outward from the inner edge of shoulder 41. Tube 40 is supported by annulus 43. The conical catalyst section is shown as a triple layer 44 attached by welding, as at 45, to a thin, annular sheet-metal collar 46 having a flat section 47 adapted to rest on the shoulder 41 of ring 40. Collar 477 of ring 46 is held in place by an annular ceramic ring 48 of material compatible with the low iron refractory material used in the remaining portions of the inner lining. This structure has the advantage that by lifting tube 40 the whole catalyst assembly may be removed for cleaning or repair. A more complete showing of the use of this type mounting is shown in Figure 4.

One feature which is highly important in practice is shown to advantage in Figure 3. This is the sloping face 42 of block 40 or its equivalent. While this construction is not structurally necessary, in practice it has a very definite advantage. By its use, space is provided for the free circulation of gas around the entire outer surface of the conical segment of the catalyst structure. The maximum circulation consistent with sufficient structural strength is thereby provided. This helps maintain a more nearly uniform temperature over the catalyst structure. In addition, this provision for free circulation assists in obtaining more uniform flow through the whole gauze which in turn favors more efficient operation and prolongs the active life of the catalyst structure.

In the type of reactor shown in Figure 1, brick or other refractory and insulating material is used to protect the shell. This type of structure is always subject to the possibility of dusting from the insulating bricks, through expansion and contraction during heating and cooling periods. This dust may be deleterious to the catalyst and may even induce side reactions or backfiring. An alternative structure, utilizing a fluid cooling system to obviate the necessity for the insulating brick is shown in Figure 4.

In Figure 4 it will be seen that the inner, low-iron, refractory lining of mullite or the like, is made up of tube 40 anad ceramic annuli 43, 49, 50, 51, 52 and 53, corresponding to the ceramic annuli of similar function in the reactor shown in Figure 1. These annuli are directly enclosed by an outer shell or casing 54 having an open top 55 closed, like the similar opening shown in Figure 1, by a suitable cover 4 which in turn is fitted with a frangible explosion disc 5 held in place on flange 6 by a suitable ring 7 and bolts 8. The upper part of the casing in this design also has a hollow section 56 through which fluid may be circulated through inlet and outlet ports 57 and 58 respectively. Similarly, the lower part of the casing has a hollow section 59 at the bottom through which fluid may be circulated through inlet and outlet ports 60 and 61 respectively. The casing is equipped at the top and bottom with means, such as flanges 62 and 63, for attaching cover 4 and a gas discharge conduit, not shown, respectively.

As in the design of Figure 1, the lining made up of superposed highly refractory ceramic annuli again serves to separate the inner space into two sections, chamber 64 and combustion chamber 65. Separation of these chambers is completed by the conical section 44 of the catalyst structure and its collar 46 which is held in place by ring 48.

The gas mixture is introduced into gas chamber 64 through the open mouth 66 of conduit 67. The latter usually is of the same material as the outer casing, preferably aluminum, and is flanged at its outer end, as at 68, to provide means for attaching a gas delivery conduit. The latter, being conventional and forming no part of the present invention, is not illustrated.

As in Figure 1 the catalyst mounting includes a tube, here 40, which extends above opening 66 sufficiently to prevent direct flow of gas from conduit 67 to the gauze. Gas flows in as near stream line flow as possible from gas chamber 64 down through tube 40, through the conical gauze 44 and into combustion chamber 65, burning in passing through or immediately after passing through the gauze. Combustion products pass down through the combustion chamber 65 and out the lower end of the apparatus. Since these gases will be still above the melting point of aluminum, if the latter metal is used in handling the combustion products the exit conduit will also have to be protected, for example, as by a water jacket as shown in Figure 1.

In these respects the chamber differs in no essential characteristics from the chamber of the apparatus of Figure 1. Several structural distinctions, other than the provision for mounting the catalyst in a different way, however, may be noted. For example, the outer layers of refractory material surrounding the mullite lining of the combustion chamber proper in Figure 1 have, in the apparatus of Figure 4, been eliminated. Instead, the side walls have been jacketed so that cooling fluid can be circulated therethrough to keep the actual casing wall temperatures at permissible levels for the pressures involved.

If so desired, the hollow side walls of shell 54 may be made in one piece as was done in the case of Figure 1. In larger size apparatus, however, it is, as shown, usually simpler to construct the casing in two or more parts, providing flanges 69 and 70, or their structural equivalent, whereby the upper and lower parts of the casing may be fastened together by any suitable means such as bolts 71 and nuts 72. In this structure also, the cooling of the side wall is accomplished by two cooling chambers 73 and 74 having fluid inlets 75 and 76 respectively and fluid outlets 77 and 78 respectively. This also offers an advantage in practice in that, as was discussed above, it is frequently more desirable to remove heat at a different rate in the lower part of the vessel.

In the structure of the apparatus shown in Figure 4, a metal closure ring 79, resembling in function a gasket is employed rather than to bring the flanges 69 and 70 into immediate juxtaposition. This simplifies provision of a plurality of small conduit means 80 through which the operative ends of such accessories as the igniter, thermocouples and the like may be introduced into the combustion chamber. Use of the gasket, as shown in Figure 4, may tend to produce a hot zone or ring due to the fact that the gasket cannot be readily jacketed. If this temperature becomes excessively high, as it will for some reactions, ring 79 is omitted and flanges 69 and 70 are brought into immediate juxtaposition.

By comparing the species of apparatus shown in Figures 1 and 4 and those which depart therefrom only in obvious structural equivalents, it will be seen that the reactor of the present invention must have certain common elements. These include an annular casing, preferably of aluminum metal, having an open top and bottom. While both the illustrated species are indicated as circular in horizontal cross-section, this is obviously not a wholly critical factor and shapes of other cross-section could be used.

The apparatus is provided with a cover for the open top, said cover having a frangible explosion disc, usually of sheet aluminum, mounted therein. The apparatus has a ceramic lining performing the plural functions of providing the necessary heat and corrosion resistance and dividing the inner chamber into two parts, a gas chamber and a combustion chamber. Means is provided for introducing gas to be reacted into the gas chamber and means is provided for removing the combustion products from the combustion chamber. Means is provided for removing heat from the walls of the gas entrance chamber and from the lower part of the combustion chamber. Means is provided to insure against direct gas flow from the inlet conduit to the catalyst, thereby aiding in establishing uniform flow of gas from the gas chamber to and through the catalyst.

Means is provided for mounting a conical shaped metallic gauze structure so that all gas passing from the gas entrance chamber into the combustion chamber must flow through the catalyst. The base of the conical gauze extends across the opening between the two inner chambers and the apex of the cone extends down into the combustion chamber. The cone mounting means comprises means for holding the cone effectively in place without the necessity for supports within the combustion chamber. Means is provided for bringing an igniter into proximity with the surface of the cone in the combustion chamber.

Other features have been shown as adapted for different purposes, for example, the provision of one or more auxiliary cooling chambers for removing heat through the side walls, means for fabricating the outer casing in one or more parts, adaptability of the lining to mounting the conical catalylst in different ways, and various means for utilizing such ancillary equipment as temperature measuring devices and the like. If so desired sight glasses also can be provided. These ancillary features may be variously made, altered or substituted without departing from the spirit of the invention provided the essential elements of the reactor are present.

As was noted above in discussing the various catalyst mountings, provision is always made for circulation of hot gases about the outer surface of the catalyst structure at the junction between the gauze proper and the supporting sleeve, and also so far as possible about the ceramic material in contact with the catalyst. This is done to maintain, so far as possible, equal temperatures in all parts of the catalyst structure. Such temperature equalization is important because the coolest part of the catalyst structure will always be at or near the points of support and failure of the catalyst structure will always be instituted in the coolest zone. It may be desirable in many cases, therefore, to provide some means for supplying small amounts of additional heat, either to the catalyst metal support ring or to the ceramic material in contact therewith.

One such arrangement for this purpose is shown in Figure 1. An electrical coil 89 is provided about the outer circumference of the metal supporting sleeve, the coil being supplied with energy through leads 90 and 91. The coil itself may be a direct resistance heating unit, in which case the wires will be suitably insulated each from the other and from the metal sleeve. In other instances, the coil may comprise an induction type heater in which, by circulating high frequency current in the coil, heating can be induced in the metal sleeve.

Another heater arrangement is shown in Figure 4. An electrical coil 92, energized by current from leads 93 and 94 is wound about the outer surface of ring 48. As shown in the drawing, the wires comprising the coil are set into a spiral scoring on the surface of the tube. This is a preferable, but not necessary, arrangement. It will be seen that the heating arrangement in Figure 4 is primarily designed to heat the ceramic material direct and thereby heat the metal supporting sleeve indirectly by heat conduction thereto. This is in contrast to the arrangement shown in Figure 1 in which the primary purpose is the direct heating of the metal sleeve. Either arrangement may be used, as may be the variations in the type of heating coil itself and the manner in which it is energized.

One feature also might be noted, although it does not form a necessary part of the present invention. Painting of the outer shell, which normally is made of aluminum metal, may effectively increase its emissivity. Various paints for the purpose are commercially available.

I claim:

1. A catalytic reactor having in combination: a vertically-positioned, elongated, metal casing; a horizontal dividing means, whereby the space within the casing is vertically separated into a gas chamber and a combustion chamber, consisting of refractory ceramic segments of suitable arc positioned symmetrically about the vertical axis of said casing; a single central port in said dividing means, said port having a symmetrically enlarged opening at its combustion chamber end; a refractory ceramic conduit in and otherwise closing said port extending therefrom at least into said gas chamber; a catalyst structure consisting of an annular metal base having unitarily attached thereto a pyramidally-shaped gauze of the same metal, said catalyst being positioned with the annulus only in contact with ceramic material only, the apex extending into the combustion chamber and the base otherwise closing the combustion chamber end of said conduit; a refractory ceramic lining in said combustion chamber consisting of said dividing means and a plurality of additional superposed refractory ceramic annuli; a gas inlet port in the gas chamber side at a level between said dividing means and the gas chamber end of said conduit; a gas outlet in the combustion chamber end most remote from said port; a first hollow jacket means comprising at least the portion of said casing adjacent the gas chamber face of said dividing means; a second hollow jacket means comprising at least the end portion of said casing around said gas outlet; and independent ports to introduce fluid into said first and second jacket means and to remove fluid from said first and second jacket means.

2. A reactor according to claim 1 characterized in that the pyramidally-shaped gauze is a complete cone surface and said gauze is mounted in contact with ceramic material only.

3. A reactor according to claim 1 characterized in that an electrical heating coil is located about but not in contact with that portion of the catalyst in contact with the ceramic support.

4. A reactor according to claim 1 characterized in that said casing is aluminum, said ceramic annuli are composed of a smooth, hard, low-iron content refractory, and that a plurality of concentric layers of insulating blocks are interposed between said lining and said casing; the material of each of said layers being such that a thermal gradient through said composite lining is maintained from temperatures of 300°–500° F. at the casing to 1500°–3000° F. within the combustion chamber.

5. A reactor according to claim 1 characterized in that said casing is aluminum, said ceramic annuli are composed of a smooth, hard, low-iron content refractory, and that said casing is provided over substantially its whole surface with hollow jackets for the circulation of cooling fluid therethrough.

ALFRED G. HOUPT.

REFERENCES CITED

The following references are of record in the file of this patent:

UNITED STATES PATENTS

| Number | Name | Date |
|---|---|---|
| 1,193,799 | Landis | Aug. 8, 1916 |
| 1,309,623 | Henwood | July 15, 1919 |
| 1,889,549 | Hechenbleikner et al. | Nov. 29, 1932 |
| 1,894,992 | Hechenbleikner et al. | Jan. 24, 1933 |
| 1,923,865 | Handforth | Aug. 22, 1933 |
| 1,927,508 | Titlestad et al. | Sept. 19, 1933 |
| 1,986,396 | Handforth et al. | Jan. 1, 1935 |
| 2,013,979 | Bray | Sept. 10, 1935 |
| 2,387,731 | Allen | Oct. 30, 1945 |
| 2,407,882 | Hutchinson | Sept. 17, 1946 |
| 2,417,348 | Carter | Mar. 11, 1947 |